United States Patent [19]

Fujitani et al.

[11] 4,239,656

[45] Dec. 16, 1980

[54] CATALYST FOR PURIFYING EXHAUST GASES AND CARRIER FOR THE CATALYST

[75] Inventors: Yoshiyasu Fujitani; Hideaki Muraki, both of Nagoya; Shiroh Kondoh, Aichi; Kouji Yokota, Nagoya, all of Japan

[73] Assignee: Kabushiki Kaisha Toyota Chuo Kenkyusho, Nagoya, Japan

[21] Appl. No.: 27,037

[22] Filed: Apr. 4, 1979

[30] Foreign Application Priority Data

Apr. 4, 1978 [JP] Japan ................................ 53-40077
Apr. 12, 1978 [JP] Japan ................................ 53-42743

[51] Int. Cl.$^3$ ...................... B01J 21/04; B01J 23/10; B01J 23/58
[52] U.S. Cl. .................................. 252/462; 252/438; 252/455 R; 423/213.5
[58] Field of Search ............. 252/463, 466 PT, 455 R, 252/438, 462; 423/213.5, 600; 106/62

[56] References Cited

U.S. PATENT DOCUMENTS

| | | | |
|---|---|---|---|
| 2,071,119 | 2/1937 | Harger | 252/463 X |
| 3,741,725 | 6/1973 | Graham | 252/466 PT |
| 3,751,508 | 8/1973 | Fujiso et al. | 252/463 X |
| 3,791,992 | 2/1974 | Feldwick | 252/463 |
| 4,049,582 | 9/1977 | Erickson et al. | 252/466 PT |

FOREIGN PATENT DOCUMENTS 5339281  9/1976  Japan.

*Primary Examiner*—W. J. Shine
*Attorney, Agent, or Firm*—Oblon, Fisher, Spivak, McClelland & Maier

[57] ABSTRACT

A catalyst for removing nitrogen oxide, carbon monoxide and hydrocarbon impurities from exhaust gases comprising a porous carrier consisting essentially of alumina-magnesia spinel; and a metal supported thereon selected from the group consisting of platinum, palladium and mixtures thereof.

11 Claims, 3 Drawing Figures

CATALYST FOR PURIFYING EXHAUST GASES AND CARRIER FOR THE CATALYST

BACKGROUND OF THE INVENTION

1. Field of the Invention

The present invention relates to a catalyst for purifying exhaust gases which very efficiently removes nitrogen oxides, carbon monoxide and hydrocarbons, which are the noxious components of exhaust gases from internal combustion engines, and the like. The catalyst of the present invention has high mechanical strength and durability at high temperatures.

2. Description of the Prior Art

Various catalysts have been suggested up to the present for removing the noxious components from exhaust gases discharged from various combustion devices. Catalysts containing platinum, palladium or rhodium as an ingredient supported on an alumina carrier are considered to have a relatively superior purifying activity. However, these catalysts are still unable to meet the requirements for the purification of motor vehicle exhaust gases because they cannot remove nitrogen oxides, CO and hydrocarbons from the exhaust gases in high efficiency, and they do not have superior strength and durability at high temperatures. Therefore, a need continues to exist for a catalyst of improved efficiency for removing noxious components from exhaust gases.

SUMMARY OF THE INVENTION

An object of the present invention is to provide a catalyst for efficiently and effectively removing noxious components from exhaust gases.

Briefly, this object and other objects of the present invention as hereinafter will become more readily apparent can be attained by a catalyst for purifying exhaust gases, comprising platinum (Pt), palladium (Pd) or both supported on a carrier, said carrier being a porous body consisting essentially of alumina-magnesia spinel ($MgAl_2O_4$) or alumina-magnesia spinel and ceria.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention provides a catalyst which can remove noxious components, i.e., nitrogen oxides ($NO_x$), carbon monoxide (CO) and hydrocarbons (HC), from exhaust gases in high efficiency. The catalyst exhibits an especially superior effect for the simultaneous removal of noxious components from gases discharged from an internal combustion engine which is operated at an air-fuel ratio (the weight ratio of air to gasoline fed into the internal combustion engine) of from 12.0 to 18.0. Since the porous carrier of the catalyst of the present invention contains magnesia-alumina ($MgAl_2O_4$) spinel, the catalyst has high mechanical strength at high temperatures. Furthermore, even when it is used at high temperatures, the crystal structure of the alumina does not change as in the case of general alumina carriers, and the losses in surface area and the reductions in strength which accompany the above changes are obviated. Moreover, the catalyst exhibits good durability at high temperatures.

As far as the porous carrier is concerned, it is preferred that the alumina and magnesia components which constitute the porous body be present each in an amount of not more than 25% by weight based on the spinel.

(calculated as % $Al_2O_3$ or % MgO =

$$\frac{\text{wt. of } Al_2O_3 \text{ or MgO}}{\text{wt. of spinel}} \times 100).$$

One or both of alumina and magnesia in the carrier may be present in the spinel carrier dependent on the indicated ratios, uniformity of the mixed powders, or the sintering conditions such as sintering temperature. According to comparative tests involving three kinds of catalysts, each of which consists of spinel, 4 wt.% of ceria, and 0.16 wt.% of palladium and then either alumina or magnesia or neither of these two components, and each of which have substantially the same surface area and apparent specific gravity as each other, the catalyst containing magnesia is superior to the other catalysts in reducing exhaust gas impurities for a gas having an air-fuel ratio of 13. However, the catalyst containing alumina is superior for oxidizing the components of an exhaust gas having an air-fuel ratio of 16. These results lead to the conclusion that a catalyst containing both alumina and magnesia is preferred for the treatment of exhaust gases having widely varying air-fuel ratios. If the alumina or magnesia is present in too large an amount, however, the aforesaid effect attributed to the presence of spinel cannot be achieved. On the other hand, the above effect can be achieved even when the alumina and magnesia are present in only small amounts, i.e., not less than 1 percent.

Preferably, the porous carrier has an average pore diameter of 0.01 to 2 microns. If the average pore diameter falls outside the above-specified range, it is difficult for the catalyst to exhibit superior activity for the purification of exhaust gases.

Platinum, palladium or both metals can be supported on the porous carrier body in the same way that catalyst ingredients are ordinarily supported on a carrier. For example, the porous body can be dipped into a solution of raw materials of catalyst ingredients such as platinum nitrate, chloroplatinic acid, palladium nitrate or palladium chloride. The treated carrier can then be dried and calcined. When the carrier is immersed in the solution, the total amount of the catalyst ingredients deposited is preferably 0.01 to 5% by weight based on the weight of the porous body. If the amount is less than 0.01%, the purifying activity of the catalyst is low. On the other hand, if its amount is more than 5%, no corresponding increase in activity can be observed.

In the present invention, the aforesaid porous body is produced, for example, by mixing a magnesia powder and an alumina powder, molding the mixture into the desired shape and heating it to form a porous sintered body. Alternatively, the surface of a porous sintered body of alumina powder can be impregnated with a magnesium compound, such as magnesium nitrate or magnesium chloride, convertible to magnesia upon heating, and then the impregnated porous body is heated at 1000° to 1600° C. to react the alumina with magnesia on the surface of the alumina powder sintered body. By this technique, a spinel of MgO and $Al_2O_3$ is formed on the surface portion of the sintered alumina particles.

In the first of the two methods for producing the porous sintered body described above which starts from alumina and magnesia powders, a molded article composed of a mixture of both is calcined at 1000° to 1600° C. At temperatures below 1000° C., the calcination is insufficient, and the amount of $MgAl_2O_4$ spinel which forms is too small. Moreover, the strength of the carrier is weak. When the calcination temperature exceeds 1600° C., the particles of $MgAl_2O_4$ spinel grow excessively, and the pore volume of the porous body decreases. When the calcination is carried out at 1200° to 1600° C., alumina reacts with magnesia and more than 75% of the components react to form $MgAl_2O_4$ spinel. Accordingly, a carrier having better thermal stability and strength can be obtained. Since the spinel is formed by the reaction of equimolar amounts of magnesia and alumina, unreacted magnesia or alumina remains in the carrier. Equimolar amounts of magnesia and alumina correspond to a weight ratio of alumina to magnesia (alumina/magnesia) of 2.6:1.

To obtain a porous body having an average pore diameter of from 0.01 to 2 microns, an alumina powder having an average particle diameter of 0.01 to 2 microns is used. That is, the diameter of an alumina powder controls the average pore diameter of the resulting carrier. The "particle diameter", used herein, denotes a weight average particle diameter.

Suitable sources of alumina include not only α-alumina, but also other types of aluminas such as γ-alumina.

The magnesia powder which is mixed with the alumina powder and the like, has been found by a scanning electron microscope to serve as the most suitable binder for the alumina powder in the porous sintered body. Therefore, the particle diameter of the magnesia powder is not particularly limited. In order for the magnesia powder to be mixed almost uniformly with the alumina powder thereby forming spinel with alumina, and in order to make the pure diameter of the resulting carrier nearly uniform, the use of a magnesia powder having a particle diameter of 0.1 to 500 microns is preferred. Thus, the magnesia powder serves as the binder to form the skeleton of the spinel and to reinforce the skeleton.

In the preparation of the carrier, the ratio of the alumina powder to the magnesia powder (alumina/magnesia) ranges preferably from 1.5:1 to 3.5:1 by weight. If the weight ratio is less than 1.5:1, the amount of the magnesia is too large. As a result, the magnesia crystallizes by the heat of calcination to form large crystals composed only of magnesia, and therefore, the number of pores in the carrier decreases. Furthermore, the alumina and ceria particles are coated by large amounts of magnesia, and the desired carrier is difficult to obtain. If the weight ratio is larger than 3.5:1, the amount of magnesia is too small. This state results in weakened bonding to the alumina, and the strength of the carrier is likely to be reduced.

The amount of ceria or the cerium compound, calculated as cerium oxide (ceria), mixed with the magnesia powder and the alumina powder in the preparation of the carrier is 0.05 to 20% by weight based on the total weight of the magnesia and alumina powder; this in view of the aforesaid reason for the presence of ceria in the carrier.

Examples of the cerium compound convertible to ceria by heating are cerium acetate, cerium carbonate and cerium nitrate. These cerium compounds are converted to ceria by decomposition during the calcination of the powdered mixture. The particle diameter of the powdered ceria or cerium compound is not particularly limited. But preferably, it has an average particle diameter of from 0.01 to 2 microns. Furthermore, because the carrier contains ceria, entry or liberation of oxygen into or from the surface of the carrier is easy so that reactions on the catalyst surface are stabilized. Presumably, entry and liberation of oxygen into and from the carrier occurs with relative ease because ceria is present among the $MgAl_2O_4$ spinel particles forming the matrix of the carrier, and cerium (Ce) and oxygen (O), the elements constituting ceria, relatively easily combine with, or separate from, each other to form $CeO_2$, or $Ce_2O_3$ and $O_2$. This leads to the understanding that for example, when a catalyst supported on the above carrier is placed in an oxygen-deficient condition (in a reducing atmosphere), oxygen is liberated from ceria and contributes to the reaction, and when the oxygen becomes excessive (in an oxidizing atmosphere), Ce combines with oxygen to change again to ceria and thus contributes to the reaction.

In calcining the mixed powder, a small amount of an organic paste such as dextrin is admixed with the mixed powder. The mixture is molded into the desired size by a tablet-forming machine, or the like, and then is calcined by an electric furnace, or the like.

Molding of the mixed powder is performed to produce any desired shape of the carrier such as a pillar, granule or honeycomb shape. In order to save fine alumina powder as a source material or to improve other characteristics of the catalyst, it is possible to use as a mother matrix a granular composition or a honeycomb structure of α-alumina, cordierite, silicon nitride, or the like. A carrier based on the mother matrix can be prepared by mixing the mother matrix with a slurry of spinel or a mixture of alumina and magnesia. Thereafter, the carrier obtained is calcined.

The present catalyst is particularly designed for the purification of exhaust gases, the catalyst comprising platinum, palladium, or both supported on a carrier, and the carrier being a porous body consisting of alumina-magnesia spinel ($MgAl_2O_4$) and ceria ($CeO_2$) or spinel, alumina ($Al_2O_3$), magnesia (MgO) and ceria, the amount of each of the alumina and magnesia being not more than 25% by weight and not less than 1% by weight based on the spinel.

In addition to acting as a catalyst for the purification of exhaust gases, the present catalyst exhibits very high activity for the removal of nitrogen oxides from exhaust gases.

The present catalyst is also especially useful as a three-way catalyst for conversions involving exhaust gases which vary widely in air-fuel ratios. The three-way effect of the present catalyst can be attributed to the fact that since the porous body contains ceria, the adsorption and desorption of oxygen onto and from the surface of the catalyst becomes easy, and reactions on the catalyst surface are activated. The ease of adsorption and desorption of oxygen is presumably because ceria is present among the $MgAl_2O_4$ spinel particles, and cerium (Ce) and oxygen (O), the constituent elements of ceria, combine with, or separate from each other relatively easily to become $CeO_2$ or $Ce_2O_3$ and $O_2$.

The amount of ceria in the support preferably ranges from 0.05 to 20% by weight based on the total weight of the spinel, alumina and magnesia components. If the amount of ceria is less than 0.05% by weight, it is difficult to obtain the above described effect attributed to the presence of ceria. If the amount of ceria is larger than 20% by weight, the above effect increases, but the bonding of the spinel particles to one another weakens thereby reducing the strength of the catalyst, and the above described effect attributed to the presence of spinel is difficult to obtain.

One process for producing the porous carrier of the present invention comprises mixing magnesia powder, alumina powder and powdered ceria or a cerium compound convertible to ceria by heating, and calcining the mixture. In this case, moreover, if an alumina powder having an average particle diameter of 0.01 to 2 microns is used, a porous carrier of the above composition having an average pore diameter of 0.01 to 2 microns can be obtained.

The ceria or the cerium compound is mixed with the other components of the substrate in an amount of 0.05 to 20% by weight calculated as cerium oxide (ceria) based on the total weight of magnesia and alumina because of the above discussed reason for incorporating ceria in the porous carrier.

Examples of cerium compounds convertible to ceria by heating are cerium acetate, cerium carbonate, and cerium nitrate. These cerium compounds change to ceria by decomposition during the calcination of the mixed powder. The particle diameter of the powder of ceria or the cerium compound is not particularly limited, but preferably, it has an average particle diameter of 0.01 to 2 microns.

The porous body containing ceria can also be produced by impregnating a magnesium compound into the surface of a porous body consisting only of alumina, heating the impregnated porous body to form spinel on its surface, then impregnating the product with a cerium compound, and heating the impregnated body to support ceria thereon.

Having generally described this invention, a further understanding can be obtained by reference to certain specific examples which are provided herein for purposes of illustration only and are not intended to be limiting unless otherwise specified.

The following Examples 1 to 5 show the carriers of the present invention and Examples 6 to 10 show the catalysts of the present invention.

EXAMPLE 1

Five types of alumina powder having an average particle diameter of 0.04, 0.15, 0.3, 0.8 and 1 micron, respectively were selected. To each of the alumina powders were added a magnesia powder having an average particle diameter of 1 micron and a ceria (cerium oxide) powder having an average particle diameter of 1 micron. The separate groups of materials were thoroughly mixed, and then molded into spherical pellets having a diameter of about 3 mm by a "Marumelizer" (Trade Mark) (pelletizer). The weight ratio of the alumina powder to the magnesia powder was 2.6:1, and the weight ratio of the ceria powder to the alumina and magnesia powders combined was 0.1:1. The first two alumina powders were γ-alumina powders and the others were α-alumina powders.

The pellets were then dried by an electric dryer, and calcined at 1350° C. for 10 hours in an electric furnace to form a carrier.

The resulting carriers were each analyzed for their component make-up by an X-ray diffraction method. It was found that all of the carriers consisted of $MgAl_2O_4$ spinel and ceria, and very small amounts of alumina and magnesia were detected.

The average pore diameter of each of the carriers was measured by a porosimeter. The results are shown in FIG. 1 by line A in which the abscissa represents the particle diameter of the alumina powder, and the ordinate represents the average pore diameter of the carrier.

Figure 1:
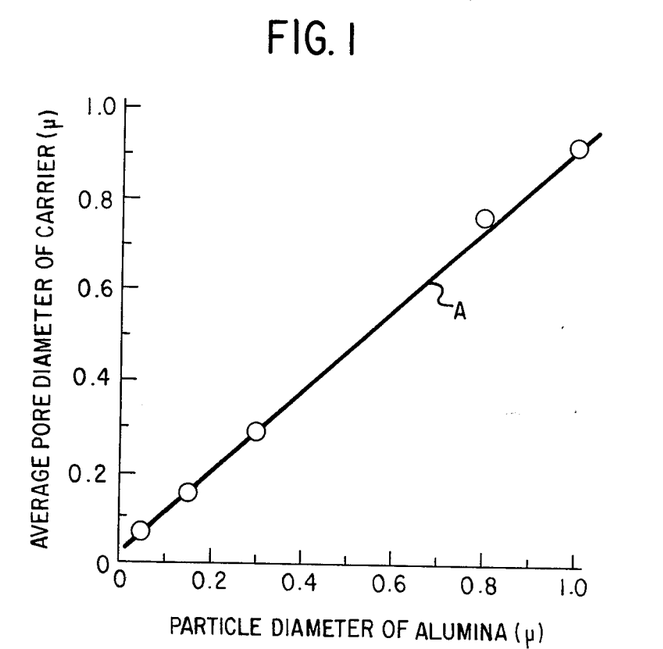
FIG. 1 is a diagram showing the relationship between the particle diameter of alumina and the average pore diameter of the resulting carrier.

It can be observed from FIG. 1 that a carrier having nearly the same average pore diameter (microns) as the particle diameter (microns) of the alumina powder can be obtained. (For example, when the particle diameter is 0.3 micron, the average pore diameter is about 0.3 micron). Furthermore, it can be observed from this that by selecting the particle diameter of the alumina powder, a carrier having the desired average pore diameter can be obtained.

EXAMPLE 2

Four types of alumina powders having an average particle diameter of 0.04, 0.15, 0.3 and 1 micron respectively, a magnesia powder having an average particle diameter of 1 or 50 microns, and a cerium oxide powder or cerium acetate powder having a particle diameter of 1 micron were taken. These materials were mixed in proportions of 65% by weight alumina powder, 25% by weight magnesia powder and 10% of cerium oxide. The mixed powder batches were molded, and calcined in the same way as shown in Example 1 to form a carrier. The manufacturing conditions are shown in Table 1.

The pore diameters (D), and the pore volumes dv/d log D for the pore diameters, of the resulting carriers were measured. The results are shown in FIG. 2 by curves 1 to 5 for the respective manufacturing conditions, in which the abscissa represents the pore diameters (microns) on a logarithmic scale and the ordinate represents the pore volumes (cm$^3$/g) on a scale of equal division.

TABLE 1

Figure 2:
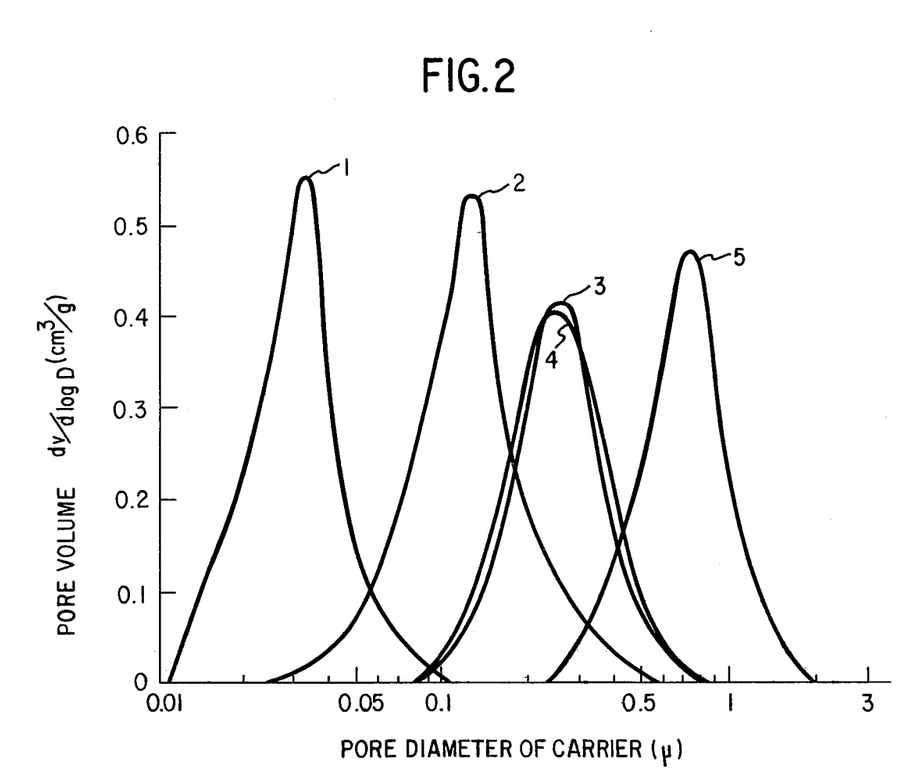
FIG. 2 is a diagram showing the relationship between the pore diameter of the carrier and its pore volume.

| No. | Rarticle diameter of alumina (microns) | Particle diameter of magnesia (microns) | Cerium compound and particle diameter | Number of curve in FIG. 2 |
|---|---|---|---|---|
| 1 | 0.04 | 1 | cerium acetate (1 micron) | 1 |
| 2 | 0.15 | 1 | cerium oxide (1 micron) | 2 |
| 3 | 0.3 | 1 | cerium oxide (1 micron) | 3 |
| 4 | 0.3 | 50 | cerium acetate (1 micron) | 4 |
| 5 | 1.0 | 50 | cerium oxide (1 micron) | 5 |

For the above materials, the pore diameter (D) denotes the pore diameter distribution of varying sizes for each carrier. The pore volume [dv/d (log D)] denotes the pore volume (cm$^3$) which exists within the range of d(log D)=0.1 at the pore diameter D (microns). The alumina powders Nos. 1 and 2 were γ-alumina powders and the alumina powders Nos. 3, 4 and 5 were α-alumina powders.

It can be observed from FIG. 2 that the distributions of the pore volumes with respect to the pore diameters (D) are steep ganssian-shaped with respect to the central line, and the pore diameters are distributed within a relatively narrow range.

Analysis of the above carriers by an X-ray diffraction method showed that in all of the carriers analyzed, $MgAl_2O_4$ spinel and cerium oxide were present.

EXAMPLE 3

A γ-alumina powder having an average particle diameter of 0.04 micron and a magnesia powder having an average particle diameter of 1 micron were mixed in a γ-alumina/magnesia ratio of 2.6:1 by weight. To each mixture was also added and mixed 10% by weight of a cerium oxide powder having an average particle diameter of 1 micron. In the same way as in Example 1, the mixture was molded, dried, and calcined for 10 hours at varying temperatures. The content of $MgAl_2O_4$ spinel in the resulting carrier was measured. The mixing ratio between the magnesia and the γ-alumina was such that when they were completely reacted (100% reacted), all of the calcined product formed the above spinel. The measurement was made by an X-ray diffraction analysis method. The results are shown in FIG. 3 by curve B, in which the abscissa represents the calcining temperature (°C.), and the ordinate represents the spinel content (%).

Figure 3:
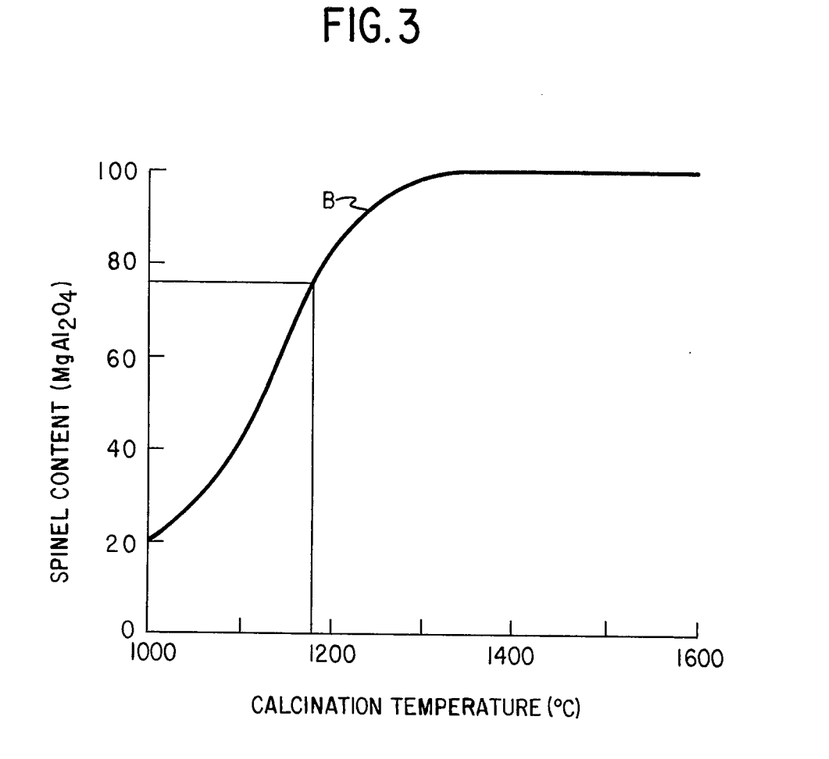
FIG. 3 is a diagram showing the relationship between the calcination temperature and the spinel content of the carrier.

As is evident from FIG. 3, the spinel is formed in an amount of about 20% at a calcining temperature of 1000° C., about 75% at 1180° C. and about 100% at 1300° C.

EXAMPLE 4

An α-alumina powder having an average particle diameter of 0.3 micron and a magnesia powder having an average particle diameter of 1 micron were mixed in an α-alumina/magnesia weight ratio of 2.8:1. To each mixture was added and mixed a cerium oxide powder having an average particle diameter of 1 micron in an amount of 5, 10, 15 and 20% by weight, respectively, based on the weight of the mixture. Each of the mixed powders obtained was molded and calcined in the same way as in Example 1 to form a carrier. For comparison, a carrier containing no cerium was prepared.

The amount of oxygen adsorption was measured with respect to the resulting carriers. Specifically, each of the carriers was reduced with hydrogen at 500° C. for 1 hour, and after deaeration, the amount of oxygen absorbed at 0° C. was measured. The results are shown in Table 2.

TABLE 2

| No. | Amount of $CeO_2$ added (wt. %) | Amount of oxygen absorbed (mole/g carrier) | |
|---|---|---|---|
| 6 | 5 | $1.6 \times 10^{-6}$ | |
| 7 | 10 | $3.0 \times 10^{-6}$ | |
| 8 | 15 | $3.8 \times 10^{-6}$ | Invention |
| 9 | 20 | $4.3 \times 10^{-6}$ | |
| 10 | None | 0 | Comparison |

It is evident from Table 2 that absorption of oxygen occurs in a cerium-containing carriers.

Accordingly, when a catalyst supported on the carrier of this invention is used in a reaction in which an oxidizing atmosphere and a reducing atmosphere are alternately generated, the reaction on the catalyst surface is stabilized by the absorption and liberation of oxygen onto and from the carrier.

EXAMPLE 5

A γ-alumina powder having an average particle diameter of 0.04 micron, a magnesia powder having an average particle diameter of 1 micron and a cerium oxide powder having an average particle diameter of 1 micron were mixed under the conditions shown in Table 3 to form spherical pellets having a diameter of 3 mm, and calcined at 1350° C. for 10 hours to produce a carrier. The composition of the carrier prepared and the compressive destruction strengths and surface areas of each carrier were measured, and the results are shown in Table 4.

TABLE 3

| No. | Mixing ratio of the materials (wt. %) | | | $Al_2O_3$/MgO weight ratio | |
|---|---|---|---|---|---|
| | $Al_2O_3$ | MgO | $CeO_2$ | | |
| 11 | 69 | 21 | 10 | 3.5 | |
| 12 | 65 | 25 | 10 | 2.6 | |
| | | | | | Invention |
| 13 | 58 | 32 | 10 | 1.8 | |
| 14 | 55 | 30 | 15 | 1.8 | |
| 15 | 76 | 14 | 10 | 5.4 | |
| | | | | | Comparison |
| 16 | 49 | 41 | 10 | 1.2 | |

TABLE 4

| No. | Composition of the carrier (wt. %) | | | | $\frac{Al_2O_3}{MgAl_2O_4}$ (wt. %) | $\frac{MgO}{MgAl_2O_4}$ (wt. %) | Compressive destruction strength (kg) | Surface area ($m^2/g$) | |
|---|---|---|---|---|---|---|---|---|---|
| | $MgAl_2O_4$ | $Al_2O_3$ | MgO | $CeO_2$ | | | | | |
| 11 | 74 | 16 | 0 | 10 | 22 | 0 | 20 | 10 | |
| 12 | 88 | 2 | 0 | 10 | 2 | 0 | 15 | 22 | |
| | | | | | | | | | Invention |
| 13 | 81 | 0 | 9 | 10 | 0 | 11 | 12 | 20 | |
| 14 | 60 | 11 | 14 | 15 | 18 | 23 | 13 | 15 | |
| 15 | 49 | 41 | 0 | 10 | 84 | 0 | 30 | 6 | |
| | | | | | | | | | Comparison |
| 16 | 68 | 0 | 22 | 10 | 0 | 32 | 8 | 15 | |

It is evident from Table 4 that the carriers of this invention (Nos. 11 to 14) exhibit a compressive strength of as high as 12 kg or more, and a surface area of as high as 10 $m^2$/g or more. In contrast, the comparative carrier (No. 15) containing a larger amount of $Al_2O_3$ and the comparative carrier (No. 16) containing a larger amount of MgO have a lower surface area or strength, and are therefore inferior.

When the carriers in accordance with this invention were subjected to a heat resistance test at 1000° C. for 50 hours, they retained the characteristics of a carrier.

EXAMPLE 6

An α-alumina powder having an average particle diameter of 0.1 micron and a magnesia powder having an average particle diameter of 0.3 micron were mixed in the ratios shown in Table 5, to form several different carriers. A small amount of water was added to each mixture and they were thoroughly mixed. Each mixture was molded into spherical pellets having a diameter of about 3 mm by a pelletizer. The pellets were heated at 1350° C. for 10 hours in an electric furnace to form porous bodies as carriers having the compositions shown in Table 5 and the pore volumes, average pore diameters and surface areas shown in Table 6.

Then, each of the resulting carriers was dipped into an aqueous solution of platinum nitrate or an aqueous solution of palladium nitrate, dried, and calcined in the air at 600° C. for 3 hours to prepare platinum (Pt) catalysts (Nos. A1 to A3) and palladium (Pd) catalyst (No. A4) shown in Table 7. Furthermore, platinum was deposited on the above carrier in the same way as above, and then palladium was again deposited to prepare a platinum-palladium (Pt-Pd) catalyst (No. A5).

To evaluate the purifying activities of these catalysts, each of the catalysts was filled in a quartz tube and kept at 500° C. An exhaust gas from an internal combustion engine of an automobile was introduced into the tube at a space velocity of 30,000/hour. The exhaust gas was obtained by operating the internal combustion engine such that the air-fuel ratio was changed periodically by 0.8 upward or downward of the theoretical air-fuel ratio (A/F=14.55) within a period of 0.5 second. The average concentrations of the noxious components in the exhaust gas in the above operation were approximately 0.1% for nitrogen oxides ($NO_x$), 0.62% for carbon monoxide (CO), 0.05% for hydrocarbons (HC), 12% for carbon dioxide ($CO_2$), 0.2% for hydrogen ($H_2$), 0.54% for oxygen ($O_2$), 13% for water ($H_2O$), and the remainder being nitrogen ($N_2$), all by volume.

The purifying activity of each catalyst was rated by the percent removal of the above noxious components. The results are shown in Table 8.

For comparison, a platinum catalyst (No. S1) and a palladium catalyst (No. S2) were prepared in the same way as above except that commercially available, conventional γ-alumina spherical particles (carrier No. C1) were used as the catalyst carriers. The conventional particles had a diameter of 2 mm and consisted only of a sintered body of γ-alumina. The catalysts were evaluated in the same manner as described above. The data for the comparative catalysts are shown in Tables 5 and 8.

TABLE 5

| Carrier No. | Starting powder (%) | | Composition of the carrier (%) | | |
|---|---|---|---|---|---|
| | Alumina | Magnesia | $MgAl_2O_4$ | $Al_2O_3$ | MgO |
| 1 | 74 | 26 | 92 | 8 | — |
| 2 | 58 | 42 | 81 | — | 19 |
| 3 | 76 | 24 | 85 | 15 | — |

(%) is by weight

TABLE 6

| Carrier No. | Pore volume ($cm^3/g$) | Average pore diameter (microns) | Surface area ($m^2/g$) | |
|---|---|---|---|---|
| 1 | 0.35 | 0.3 | 6 | |
| 2 | 0.32 | 0.3 | 5 | Invention |
| 3 | 0.30 | 0.3 | 4 | |
| C1 | 0.50 | 0.02 | 100 | Comparison |

TABLE 7

| Catalyst No. | A1 | A2 | A3 | A4 | A5 | S1 | S2 |
|---|---|---|---|---|---|---|---|
| Carrier No. | 1 | 2 | 3 | 1 | 1 | C1 | C1 |
| Amount of Pt deposited (wt. %) | 0.12 | 0.12 | 0.12 | — | 0.06 | 0.12 | — |
| Amount of Pd deposited (wt. %) | — | — | — | 0.15 | 0.10 | — | 0.15 |

TABLE 8

| Catalyst No. | Invention | | | | | Comparison | |
|---|---|---|---|---|---|---|---|
| | A1 | A2 | A3 | A4 | A5 | S1 | S2 |
| Percent removal (%) $NO_x$ | 85.3 | 89.2 | 82.3 | 80.4 | 85.6 | 66.9 | 43.3 |
| CO | 97.5 | 98.5 | 96.5 | 98.0 | 98.0 | 66.9 | 61.1 |
| HC | 96.3 | 96.5 | 96.0 | 94.4 | 96.0 | 91.0 | 58.6 |

It is evident from the above table that the catalysts of the present invention have a much higher purifying activity than the comparative catalysts (Nos. S1 and S2) on all of the noxious components tested.

EXAMPLE 7

Catalysts having ceria in a porous body were prepared. Specifically, an α-alumina powder having an average particle diameter of 0.3 micron (66% by weight), 24% of a magnesia powder having an average particle diameter of 1 micron and 10% of a ceria powder having an average particle diameter of 1 micron were mixed, and worked up in the same way as described in Example 6 to form a porous body as a carrier (Carrier No. 4, see Table 9). The carrier consisted of 83% of $MgAl_2O_4$, 7% of alumina and 10% of ceria ($CeO_2$), and had a pore volume of 0.35 $cm^3/g$, an average pore diameter of 0.3 micron and a surface area of 6 $m^2/g$.

In the same way as described in Example 6, the catalysts shown in Table 9 were prepared using the above carrier, and then their activities for purifying exhaust gases were measured. The results of measurement are shown in Table 9.

Table 9 also gives the percent removal of comparative catalysts (Nos. S3 and S4) obtained by depositing ceria on the same conventional γ-alumina carrier (No. C1) as shown in Example 6 to prepare a carrier (No. C2), and supporting platinum or palladium on this carrier in the same way as described in Example 6. The No. C2 carrier had been prepared by impregnating the No. C1 carrier with a 10% aqueous solution of cerium nitrate, drying the impregnated carrier, and heating it in air at 600° C. for 3 hours. Ceria was present on its surface. The No. C2 carrier had a pore volume of 0.5 $cm^3/g$, an average pore diameter of 0.02 micron, and a surface area of 98 $m^2/g$.

TABLE 9

| Catalyst No. | | Invention | | | Comparison | |
|---|---|---|---|---|---|---|
| | | A6 | A7 | A8 | S3 | S4 |
| Carrier No. | | 4 | 4 | 4 | C2 | C2 |
| Amount of Pt deposited (wt. %) | | 0.11 | — | 0.05 | 0.12 | — |
| Amount of Pd deposited (wt. %) | | — | 0.14 | 0.09 | — | 0.15 |
| Percent removal (%) | $NO_x$ | 92.2 | 90.4 | 92.2 | 70.3 | 53.0 |
| | CO | 97.8 | 97.7 | 97.5 | 74.0 | 71.1 |
| | HC | 99.3 | 95.5 | 98.0 | 93.0 | 63.0 |

It is evident from Table 9 that catalysts containing ceria in the porous body exhibit a high purifying effect, and have a particularly higher purifying activity than the catalysts not containing ceria in the carrier (Table 8) for the removal of nitrogen oxides. It is also evident that the catalysts (S3 and S4) having the carrier (No. C2) prepared by depositing ceria on the conventional carrier have much lower activities than the catalysts of the present invention.

EXAMPLE 8

Carriers (Nos. 5 and 6) were prepared by depositing magnesia or ceria on the No. 1 carrier shown in Example 6, and platinum was deposited on the carrier to form catalysts. The magnesia-deposited carrier (No. 5) was the one in which $MgAl_2O_4$ spinel, alumina and magnesia were present on the carrier surface. The ceria-deposited carrier (No. 6) was prepared by depositing ceria on the surface of a porous body having spinel formed therein, and thus, spinel, alumina and ceria were present on the carrier surface.

The No. 5 carrier was prepared by dipping the No. 1 carrier in a 30% aqueous solution of magnesium nitrate, drying the carrier, and calcining it in the air at 600° C. for 3 hours. The No. 6 carrier was prepared by dipping the No. 1 carrier in a 10% aqueous solution of cerium nitrate, and working it up in the same manner as described in the preparation of the No. 5 carrier. The magnesium nitrate and cerium nitrate were converted by the heating treatment to magnesia and ceria, respectively, and supported on the carrier surface. The magnesia and ceria were present each in an amount of about 2% by weight based on the total weight of the carrier.

The properties of the carriers Nos. 5 and 6 are shown in Table 10.

Using carriers Nos. 5 and 6, platinum in the amounts indicated in Table 11 was deposited on each carrier to form the catalysts. The activities on these catalysts in purifying exhaust gases were measured in the same way as described in Example 6, and the results are shown in Table 11.

TABLE 10

| Carrier No. | Pore volume (cm³/g) | Average pore diameter (microns) | Surface area (m²/g) |
|---|---|---|---|
| 5 | 0.35 | 0.3 | 6 |
| 6 | 0.35 | 0.3 | 6 |

TABLE 11

| Catalyst No. | | A9 | A10 |
|---|---|---|---|
| Carrier No. | | 5 | 6 |
| Amount of Pt deposited (wt. %) | | 0.12 | 0.11 |
| Percent removal (%) | $NO_x$ | 94.4 | 96.8 |
| | CO | 99.3 | 99.1 |
| | HC | 97.9 | 99.9 |

It is evident from the above data that the carrier having magnesia co-existent with spinel and alumina on the surface layer and the carrier having ceria present in like manner also lead to excellent purifying activities.

EXAMPLE 9

Catalysts were prepared by using a porous body obtained by forming $MgAl_2O_4$ spinel on the surface of a γ-alumina carrier, and a porous body obtained by further depositing ceria on the porous body.

Commercially available γ-alumina particles (carrier No. C1) shown in Example 6 were dipped into a 30% aqueous solution of magnesium nitrate, dried, and heated in the air at 1000° C. for 4 hours to form a carrier having $MgAl_2O_4$ spinel formed on its surface (No. 7). Furthermore, ceria was deposited on the surface of the carrier No. 7 in the same way as in Example 8 to form a carrier (No. 8) having the spinel and ceria on its surface.

The properties of the carriers Nos. 7 and 8 are shown in Table 12.

Platinum-supported catalysts shown in Table 13 were prepared by using these carriers in the same way as described in Example 6. The activities of these catalysts in purifying exhaust gases were measured in the same way as described in Example 6, and the results are shown in Table 13.

TABLE 12

| Carrier No. | Pore volume (cm³/g) | Average pore diameter (microns) | Surface area (m²/g) |
|---|---|---|---|
| 7 | 0.4 | 0.1 | 16 |
| 8 | 0.4 | 0.1 | 16 |

TABLE 13

| Catalyst No. | | A11 | A12 |
|---|---|---|---|
| Carrier No. | | 7 | 8 |
| Amount of Pt deposited (wt. %) | | 0.11 | 0.10 |
| Percent removal (%) | $NO_x$ | 89.7 | 91.0 |
| | CO | 96.9 | 97.7 |
| | HC | 98.8 | 99.8 |

It is evident from Table 13 that the catalyst having $MgAl_2O_4$ spinel or a mixture of the spinel and ceria formed on its surface layer also have a high purifying activity.

EXAMPLE 10

Catalysts were prepared by depositing platinum, palladium or both on the No. 1 carrier shown in Example 6. The activities of these catalysts in removing CO and HC in an oxygen-rich atmosphere were measured. The measurement of the purifying activities in this Example was intended to determine the performance of the catalysts as so-called "oxidation catalysts" for purifying exhaust gases. This is distinguished from the measurements in Examples 6 to 9 above which are directed to the examination of the performance of so-called "three-way catalysts" for removing $NO_x$, CO and HC simultaneously.

Accordingly, the exhaust gas introduced into each tested catalyst layer in this Example was one which was obtained by adding air to the exhaust gas used in Examples 6 to 9 thereby including much oxygen into the gas. The gas consisted of 0.9% of CO, 0.045% of HC, 12% of $CO_2$, 0.09% of $NO_x$, 0.18% of $H_2$, 2% of $O_2$, 13% of $H_2O$ and the balance being nitrogen.

The preparation of the carrier, the preparation of the catalysts, and the measurement of the purifying activities were effected in the same way as described in Example 6 except as noted above.

The amounts of catalyst ingredients deposited and the results of measurement of purifying activity are shown in Table 14.

This table also shows the data for comparative catalysts (S5 to S7) obtained by depositing catalysts ingredients in the same way as above on the conventional γ-alumina carrier (No. C1) shown in Example 6.

TABLE 14

| Catalyst No. | Invention | | | Comparison | | |
|---|---|---|---|---|---|---|
| | A13 | A14 | A15 | S5 | S6 | S7 |
| Carrier No. | 1 | 1 | 1 | C1 | C1 | C1 |
| Amount of Pt deposited (wt. %) | 0.12 | — | 0.06 | 0.12 | — | 0.06 |
| Amount of Pd deposited (wt. %) | — | 0.17 | 0.10 | — | 0.17 | 0.10 |
| Percent removal (%) CO | 100 | 100 | 100 | 100 | 100 | 100 |
| HC | 98 | 96 | 98 | 83 | 79 | 84 |

It is evident from Table 14 that the catalysts in accordance with this invention exhibit a CO removing activity equivalent to the catalysts formed from the conventional carriers, and exhibit a much higher HC removing activity than the catalysts formed from the conventional carrier.

Catalysts were prepared in the same manner as above using carrier (No. 4) of the present invention containing ceria which is shown in Example 7, and the purifying activities of the catalysts were measured. The results showed a CO removal of 100% and a HC removal of almost 100%.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A catalyst for reducing nitrogen oxide, carbon monoxide and hydrocarbons in exhaust gases, consisting essentially of: a porous alumina-magnesia spinel carrier containing from 0.05 to 20% by weight of ceria based on the spinel, said porous carrier having an average pore diameter of 0.01 to 2 microns; and a metal supported thereon selected from the group consisting of platinum, palladium and mixtures thereof.

2. The catalyst of claim 1, wherein the porous carrier contains 1 to 25% by weight of each of alumina and magnesia based on the spinel.

3. The catalyst of claim 1, wherein the porous carrier contains from 1 to 25% by weight of each of alumina and magnesia based on the spinel and from 0.05 to 20% by weight of ceria based on the total weight of said spinel, said alumina and said magnesia.

4. The catalyst of claim 1, wherein the content of the metal is from 0.01 to 5% by weight of the porous carrier.

5. A carrier for a catalyst used for reducing nitrogen oxide, carbon monoxide and hydrocarbons in exhaust gases, which consists essentially of: a porous alumina-magnesia spinel body containing 0.05 to 20% by weight ceria based on the spinel, said porous body having an average pore diameter of 0.01 to 2 microns.

6. The carrier of claim 5, wherein the porous body contains from 1 to 25% by weight of alumina and magnesia based on the spinel and 0.05 to 20% by weight of ceria based on said spinel, alumina and magnesia.

7. The carrier of claim 1, wherein the porous body is formed on the surface of a supporting ceramic matrix.

8. The carrier of claim 7, wherein the supporting ceramic matrix is selected from the group consisting of a sintered α-alumina, a sintered cordierite and a sintered silicon nitride.

9. A method for preparing the carrier of claim 5, which consists essentially of: mixing a magnesia powder, an alumina powder having an average particle diameter of 0.01 to 2 microns and a powder selected from the group consisting of ceria and a compound convertible to ceria by heating, the ratio of said alumina powder to said magnesia powder ranging from 1.5:1 to 3.5:1 by weight; forming the resulting mixed powder into a desired shape; and calcining the resulting shaped material at a temperature of 1000° to 1600° C.

10. The method of claim 9, wherein said mixed powdered material is shaped into pellets or a honeycomb structure.

11. The method of claim 9, wherein said compound convertible to ceria is cerium acetate, cerium carbonate or cerium nitrate.

* * * * *

UNITED STATES PATENT AND TRADEMARK OFFICE
CERTIFICATE OF CORRECTION

PATENT NO. : 4,239,656
DATED : December 16, 1980
INVENTOR(S) : Yoshiyasu Fujitani et al It is certified that error appears in the above—identified patent and that said Letters Patent is hereby corrected as shown below:

Claim 7, line 1, delete "1" and insert --5--.

Signed and Sealed this

Twentieth Day of October 1981

[SEAL]

Attest:

GERALD J. MOSSINGHOFF

*Attesting Officer*     *Commissioner of Patents and Trademarks*